US012666177B2

(12) United States Patent
Kanda

(10) Patent No.: US 12,666,177 B2
(45) Date of Patent: Jun. 23, 2026

(54) OPTICAL SENSING CIRCUIT AND METHOD FOR DRIVING OPTICAL SENSING CIRCUIT

(71) Applicant: KYOCERA CORPORATION, Kyoto (JP)

(72) Inventor: Eiji Kanda, Yasu (JP)

(73) Assignee: KYOCERA Corporation, Kyoto (JP)

( * ) Notice: Subject to any disclaimer, the term of this patent is extended or adjusted under 35 U.S.C. 154(b) by 65 days.

(21) Appl. No.: 18/858,513

(22) PCT Filed: Apr. 25, 2023

(86) PCT No.: PCT/JP2023/016357
§ 371 (c)(1),
(2) Date: Oct. 21, 2024

(87) PCT Pub. No.: WO2023/210664
PCT Pub. Date: Nov. 2, 2023

(65) Prior Publication Data
US 2025/0274682 A1     Aug. 28, 2025

(30) Foreign Application Priority Data

Apr. 25, 2022     (JP) .................................. 2022-071866

(51) Int. Cl.
*H04N 25/78*          (2023.01)
(52) U.S. Cl.
CPC .................................. *H04N 25/78* (2023.01)
(58) Field of Classification Search
CPC .... H04N 5/3745; H04N 5/3698; H04N 5/378; H04N 25/616; H04N 25/78
See application file for complete search history.

(56) References Cited

U.S. PATENT DOCUMENTS

| | | | |
|---|---|---|---|
| 2022/0046197 A1* | 2/2022 | Moue | H03K 5/22 |
| 2022/0094871 A1* | 3/2022 | Tomita | H03K 5/2481 |
| 2022/0113186 A1 | 4/2022 | Koide | |

FOREIGN PATENT DOCUMENTS

| | | |
|---|---|---|
| JP | 2010-268110 A | 11/2010 |
| JP | 2010-268111 A | 11/2010 |
| JP | 2022-63765 A | 4/2022 |

* cited by examiner

*Primary Examiner* — Xi Wang
(74) *Attorney, Agent, or Firm* — Procopio, Cory, Hargreaves & Savitch LLP

(57)          ABSTRACT

An optical sensing circuit includes a light detection circuit, a differential circuit, and a controller. The light detection circuit includes a photodiode with a cathode electrode and a first amplifier transistor with a gate electrode connected to the cathode electrode. The light detection circuit outputs a voltage corresponding to a voltage at the gate electrode of the first amplifier transistor. The differential circuit determines a difference between a voltage read from the light detection circuit in an exposure state and a voltage read from the light detection circuit in a reset state. The differential circuit includes a second amplifier transistor that outputs the determined difference, a first transistor connecting a gate electrode and a drain electrode of the second amplifier transistor, and a second transistor connecting the drain electrode of the second amplifier transistor and a first voltage.

7 Claims, 11 Drawing Sheets

OPTICAL SENSING CIRCUIT AND METHOD FOR DRIVING OPTICAL SENSING CIRCUIT

TECHNICAL FIELD

The present disclosure relates to an optical sensing circuit and a method for driving the optical sensing circuit.

BACKGROUND OF INVENTION

A known optical sensing circuit is described in, for example, Patent Literature 1.

CITATION LIST

Patent Literature

Patent Literature 1: Japanese Unexamined Patent Application Publication No. 2010-268110

SUMMARY

In an aspect of the present disclosure, an optical sensing circuit includes a light detection circuit, a differential circuit, and a controller. The light detection circuit includes a photodiode with a cathode electrode and a first amplifier transistor with a gate electrode connected to the cathode electrode. The light detection circuit is configured to output a voltage corresponding to a voltage at the gate electrode. The light detection circuit is operable in an exposure readout state in which the voltage at the gate electrode changes based on an amount of light received by the photodiode or in a reset readout state in which the voltage at the gate electrode is a constant predetermined voltage. The differential circuit is configured to output a difference between an exposure voltage read from the light detection circuit in the exposure readout state and a reset voltage read from the light detection circuit in the reset readout state. The differential circuit includes a second amplifier transistor configured to output the determined difference, a first transistor connecting a gate electrode of the second amplifier transistor and a drain electrode of the second amplifier transistor, and a second transistor connecting the drain electrode of the second amplifier transistor and a first voltage. The controller is configured to control the light detection circuit and the differential circuit.

In another aspect of the present disclosure, a method is for driving an optical sensing circuit including a light detection circuit and a differential circuit. The light detection circuit includes a photodiode with a cathode electrode and a first amplifier transistor with a gate electrode connected to the cathode electrode. The light detection circuit is configured to output a voltage corresponding to a voltage at the gate electrode. The light detection circuit is operable in an exposure readout state in which the voltage at the gate electrode changes based on an amount of light received by the photodiode or in a reset readout state in which the voltage at the gate electrode is a constant predetermined voltage. The differential circuit is configured to determine a difference between an exposure voltage read from the light detection circuit in the exposure readout state and a reset voltage read from the light detection circuit in the reset readout state. The differential circuit includes a second amplifier transistor configured to output the determined difference, a first transistor connecting a gate electrode of the second amplifier transistor and a drain electrode of the second amplifier transistor, and a second transistor connecting the drain electrode of the second amplifier transistor and a first voltage. The method includes causing the first transistor to be conductive and the second transistor to be nonconductive when the exposure voltage is read from the light detection circuit, causing the first transistor and the second transistor to be nonconductive when the reset voltage is read from the light detection circuit, and causing the first transistor to be nonconductive and the second transistor to be conductive when the differential circuit outputs the difference between the exposure voltage and the reset voltage.

BRIEF DESCRIPTION OF THE DRAWINGS

The objects, features, and advantages of the present disclosure will become more apparent from the following detailed description and the drawings.

DESCRIPTION OF EMBODIMENTS

Various optical sensing circuits such as image sensor circuits have been proposed. An optical sensing circuit includes multiple light detection circuits each including a photodiode and an amplifier transistor that outputs a voltage dependent on an amount of light received by the photodiode. In such an optical sensing circuit, varying characteristics of amplifier transistors may cause detection irregularities. Patent Literature 1 describes an optical sensing circuit that reduces detection irregularities caused by such varying characteristics of the amplifier transistors in the light detection circuits by determining the difference between the voltage dependent on the amount of light received by the photodiode and the voltage independent of the amount of light received by the photodiode.

In the known optical sensing circuit, differential circuits determine the differences between the voltages dependent on the amounts of light received by the photodiodes and the voltages independent of the amounts of light received by the photodiodes. The differential circuits include amplifier transistors. Thus, varying characteristics of the amplifier transistors in the differential circuits may cause detection irregularities.

An optical sensing circuit and a method for driving the optical sensing circuit according to one or more embodiments of the present disclosure will now be described with reference to the accompanying drawings. Each figure referred to below illustrates main components and other elements of the optical sensing circuit according to the embodiments of the present disclosure. In the embodiments of the present disclosure, the optical sensing circuit may include known components that are not illustrated, for example, circuit boards, wiring conductors, control ICs, and LSI circuits. The figures referred to below are schematic and the structure of the optical sensing circuit is not necessarily drawn precisely.

Figure 1:
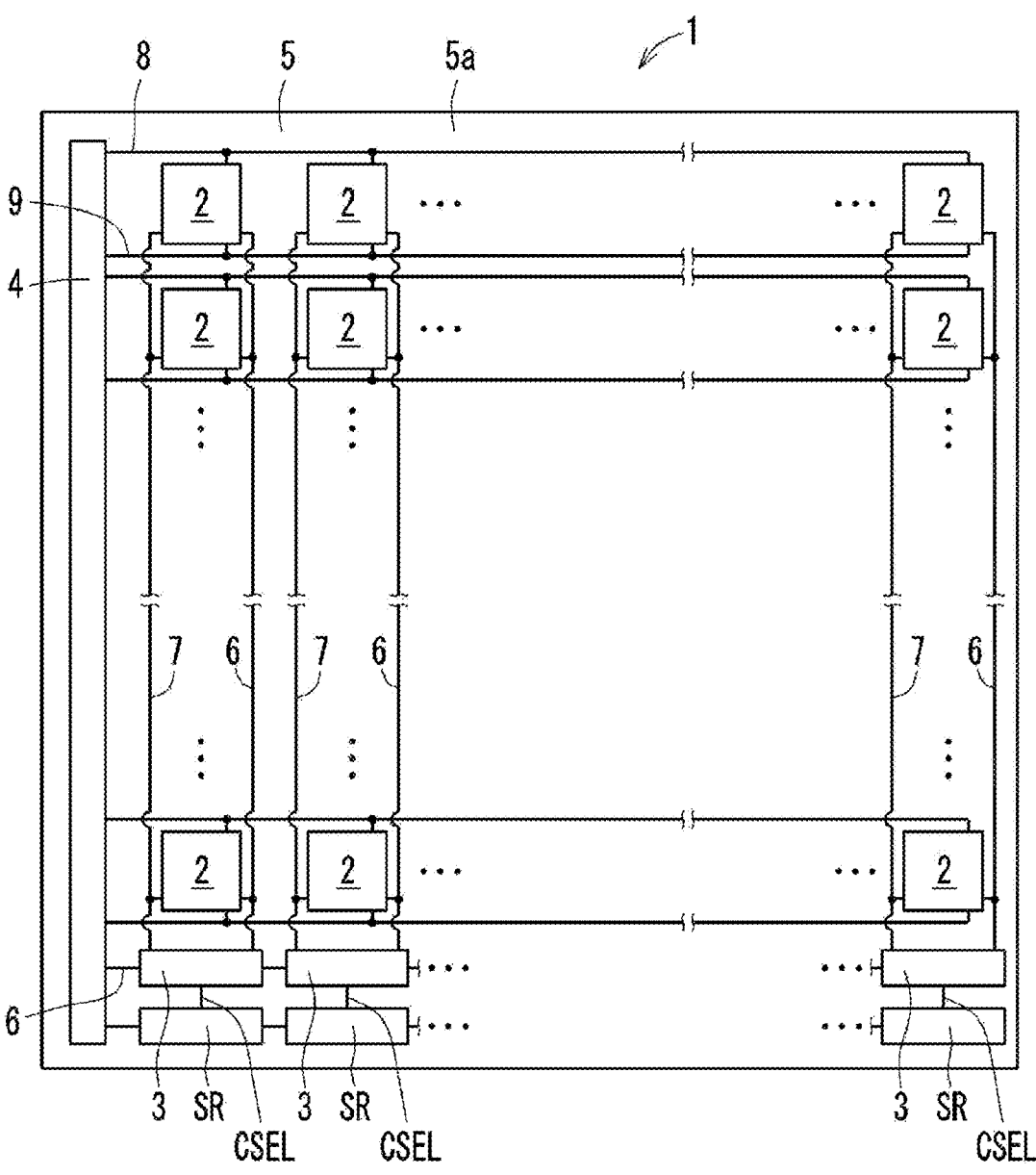
FIG. 1 is a block diagram of an optical sensing circuit according to an embodiment of the present disclosure.
Figure 2:
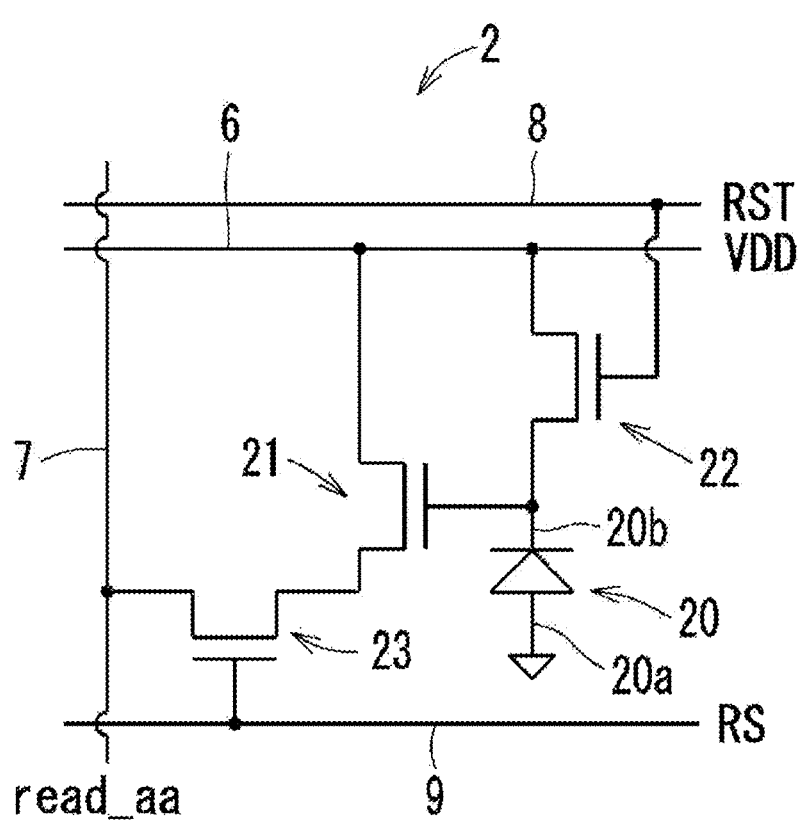
FIG. 2 is a circuit diagram of a light detection circuit in the optical sensing circuit in FIG. 1.
Figure 3:
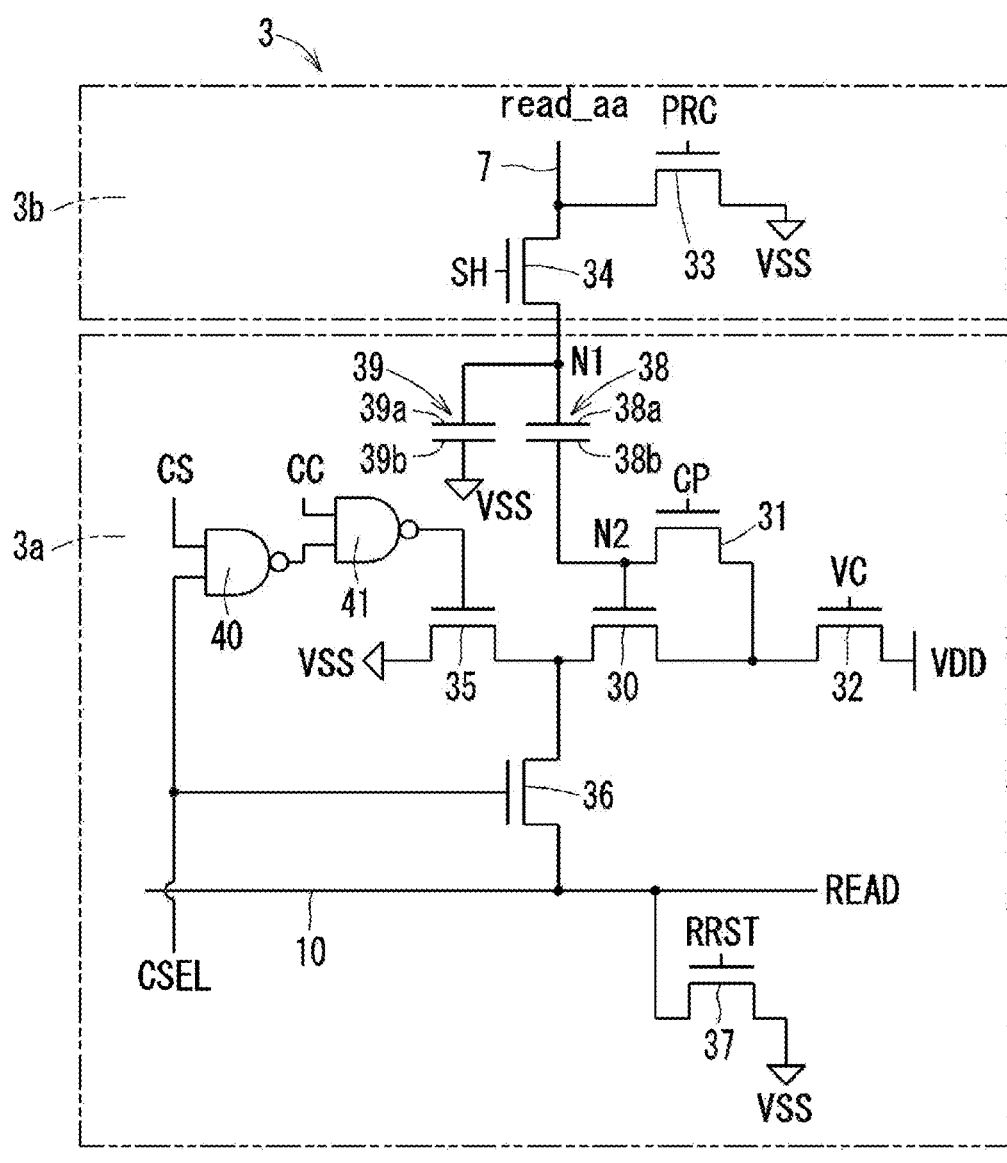
FIG. 3 is a circuit diagram of a differential circuit in the optical sensing circuit in FIG. 1.
Figure 4A:
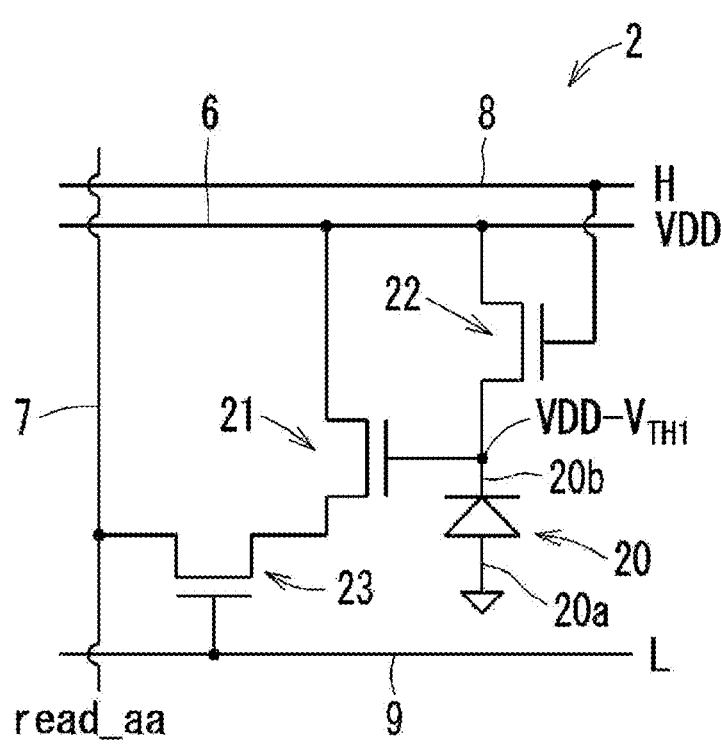
FIG. 4A is a diagram describing the operation of the light detection circuit in a reset state.
Figure 4B:
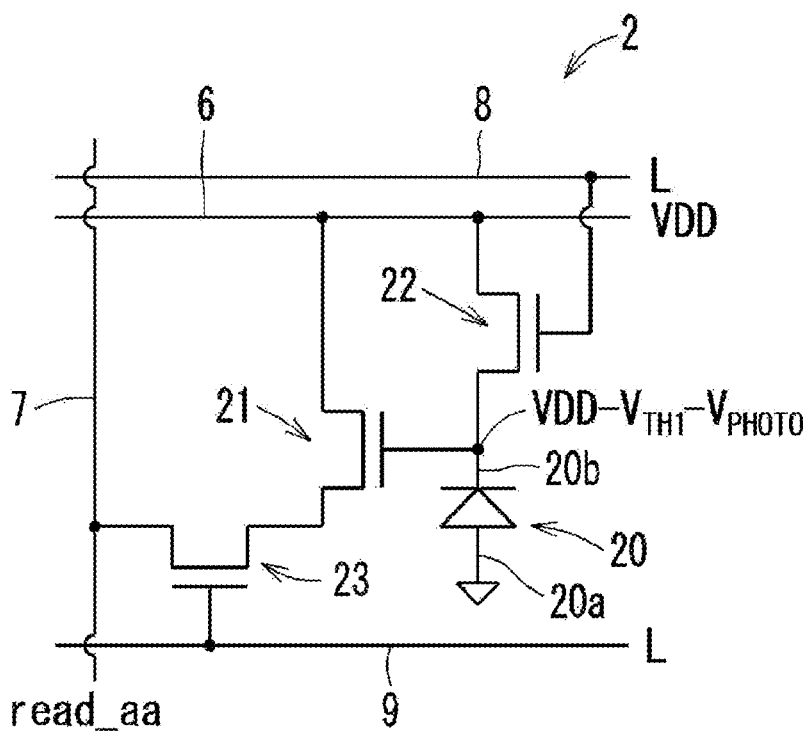
FIG. 4B is a diagram describing the operation of the light detection circuit in an exposure state.
Figure 4C:
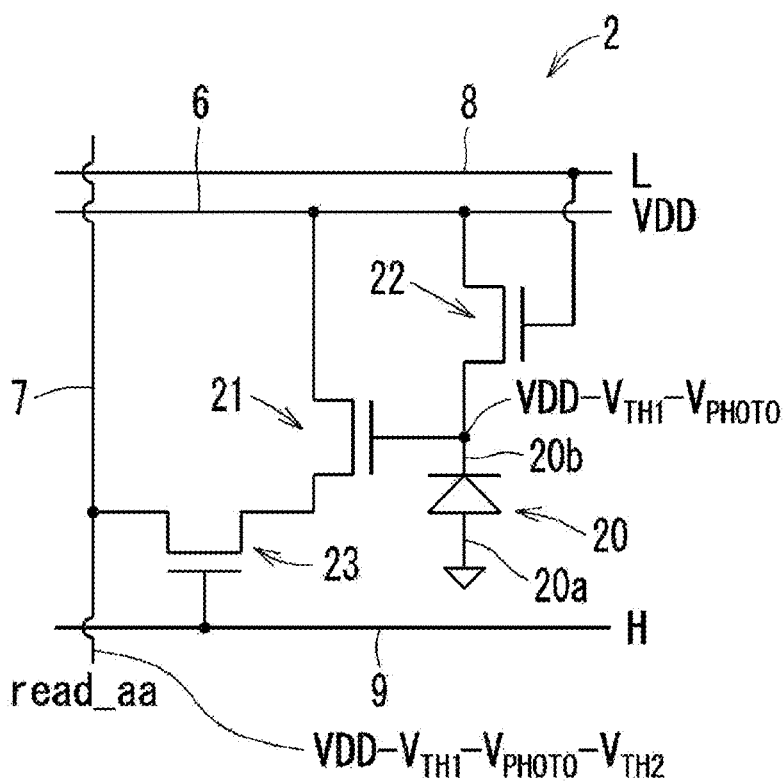
FIG. 4C is a diagram describing the operation of the light detection circuit in an exposure readout state.
Figure 4D:
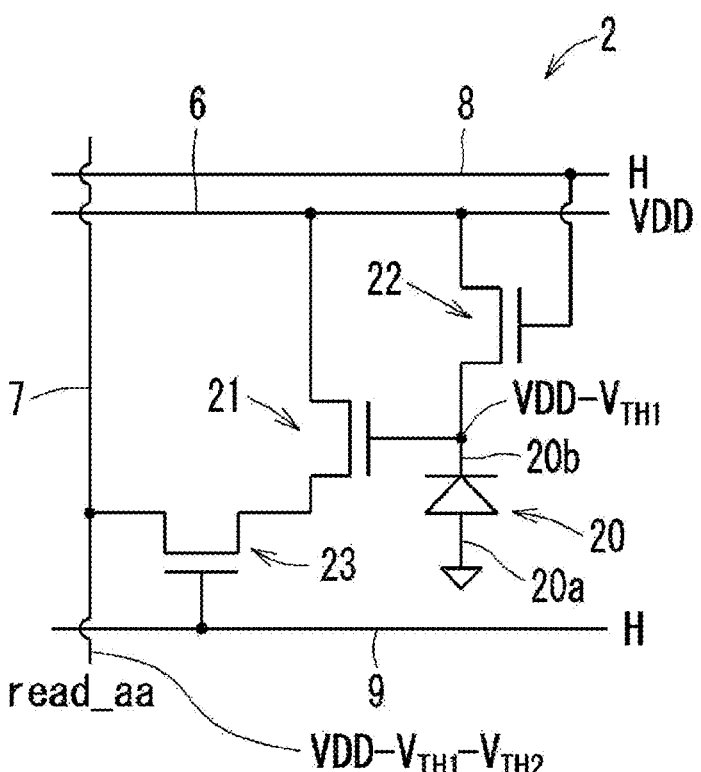
FIG. 4D is a diagram describing the operation of the light detection circuit in a reset readout state.
Figure 5A:
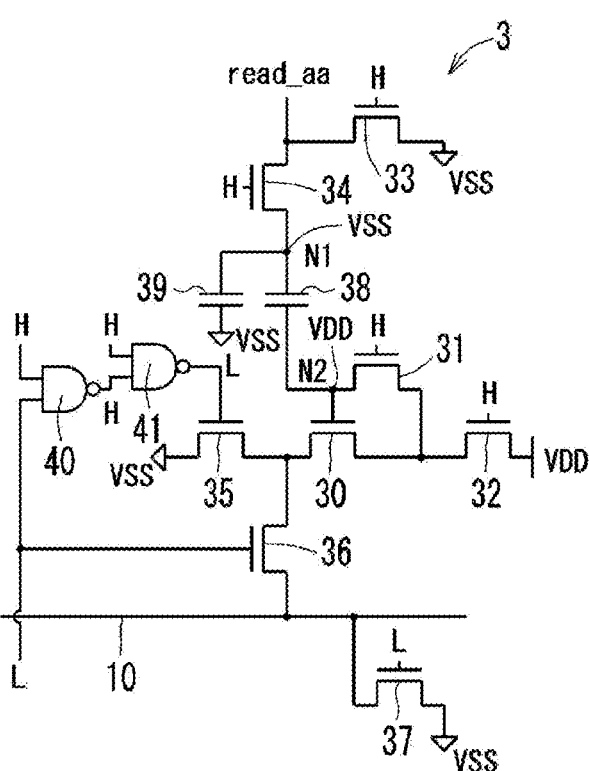
FIG. 5A is a diagram describing the operation of the differential circuit in a reset period.
Figure 5B:
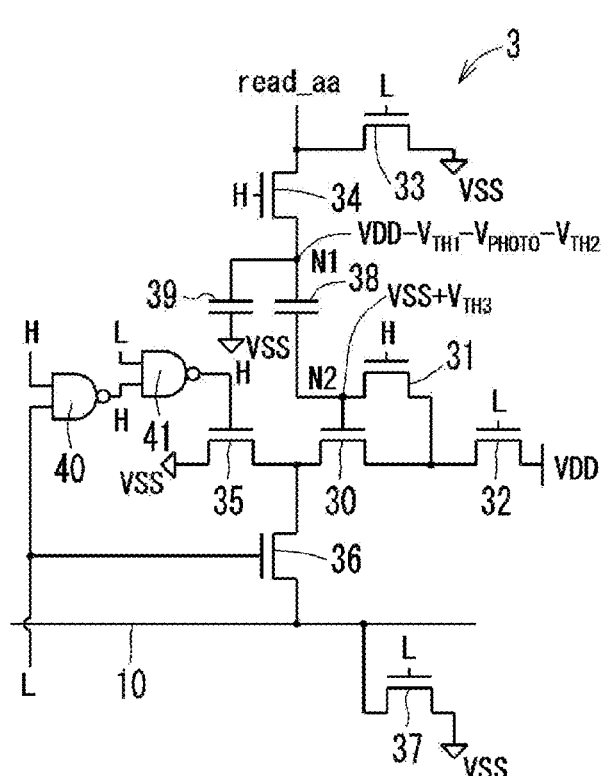
FIG. 5B is a diagram describing the operation of the differential circuit in an exposure readout period.
Figure 5C:
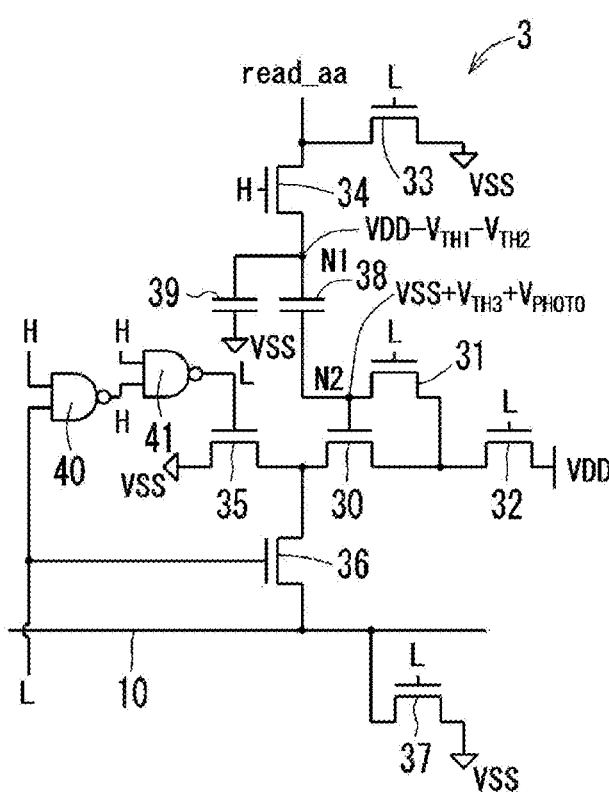
FIG. 5C is a diagram describing the operation of the differential circuit in a reset readout period.
Figure 5D:
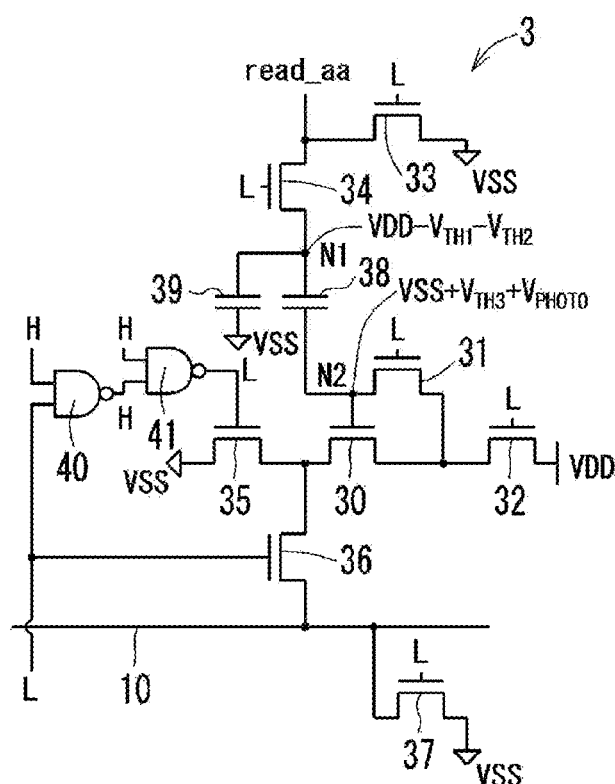
FIG. 5D is a diagram describing the operation of the differential circuit in a sample holding period.
Figure 5E:
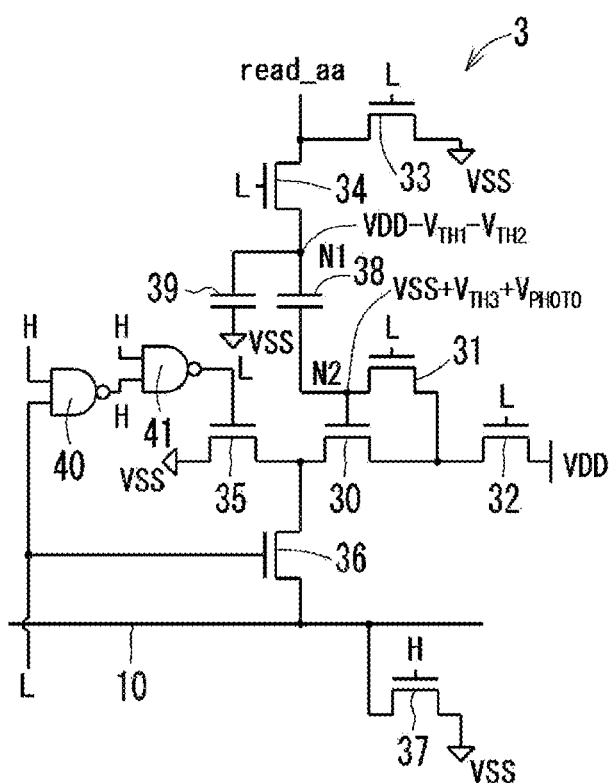
FIG. 5E is a diagram describing the operation of the differential circuit in a readout line reset period.
Figure 5F:
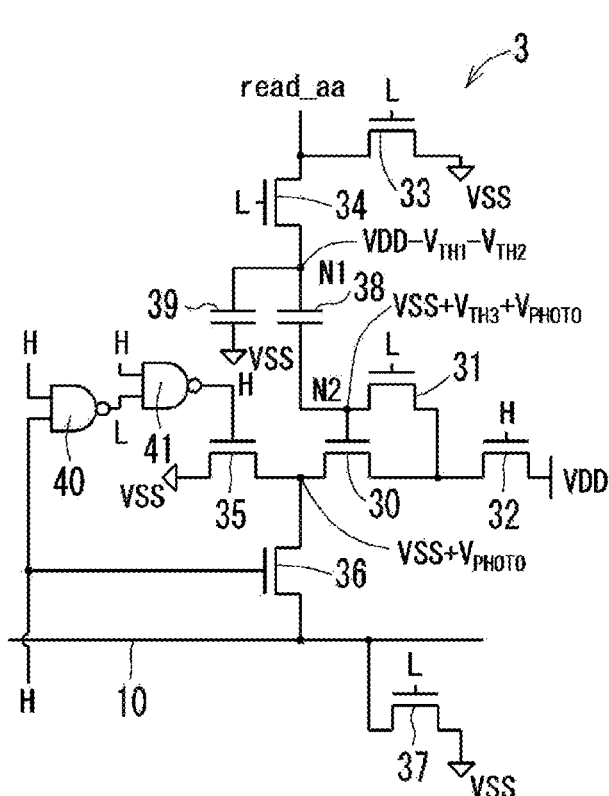
FIG. 5F is a diagram describing the operation of the differential circuit in a readout period.
Figure 6:
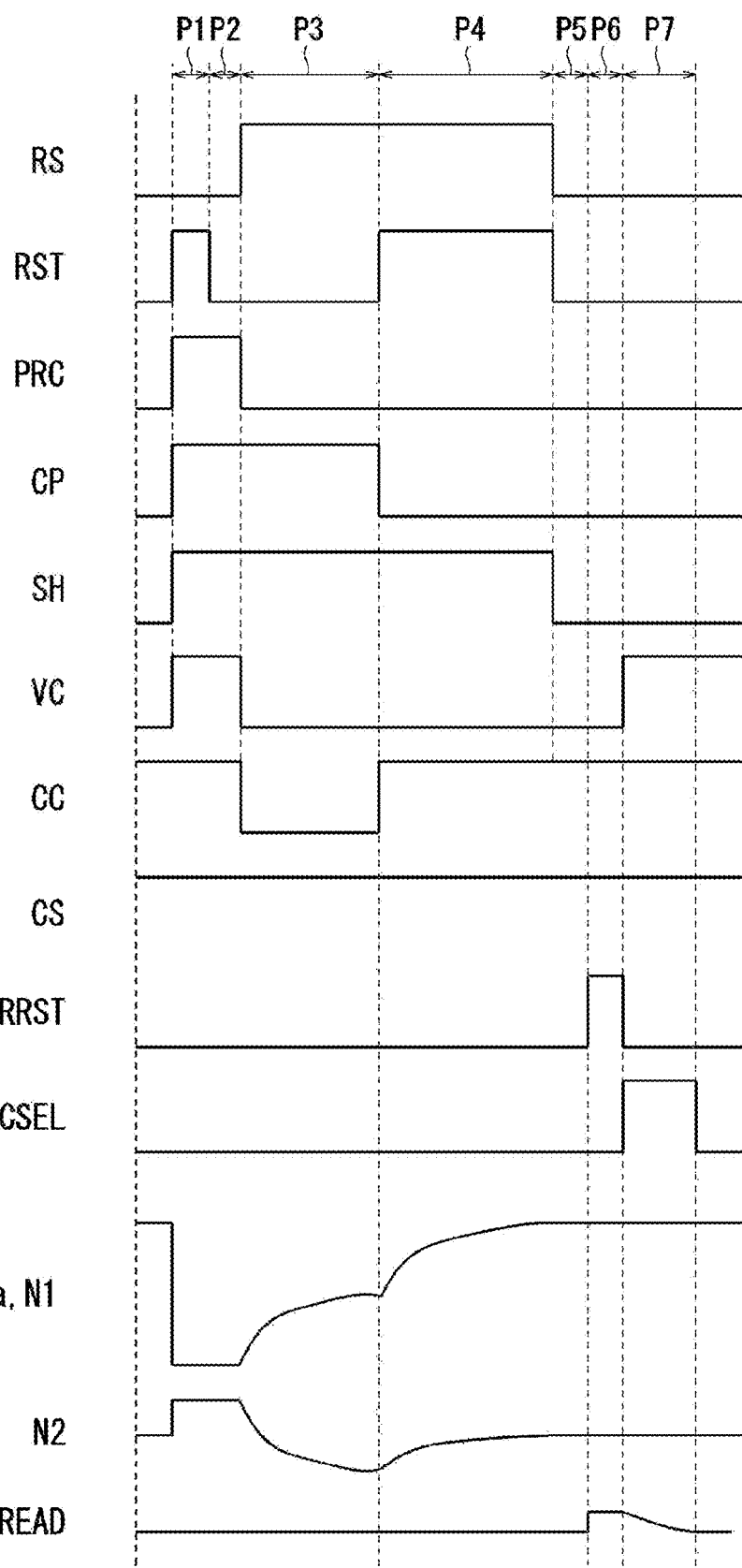
FIG. 6 is a timing chart describing the operation of the optical sensing circuit in FIG. 1.
Figure 7:
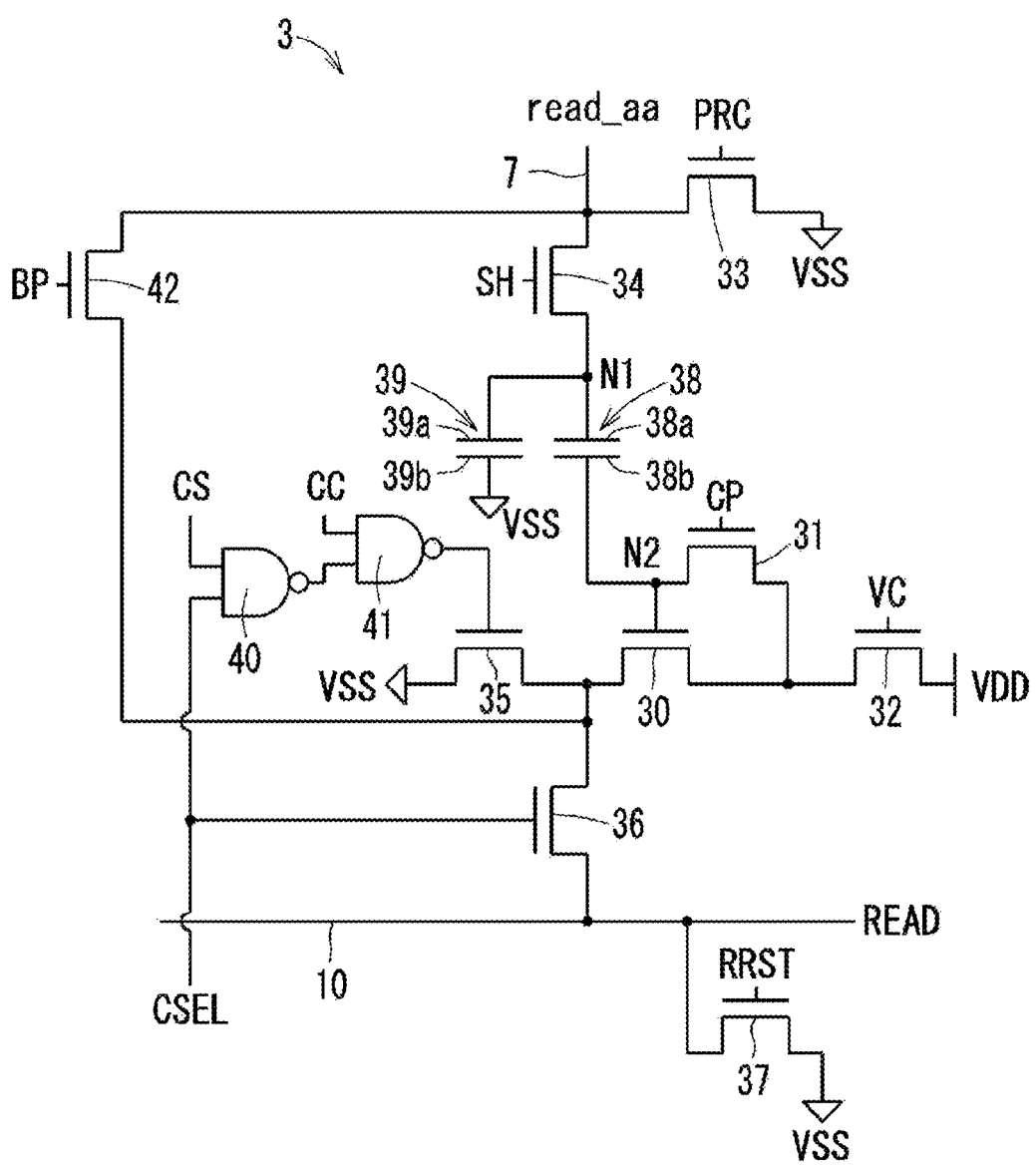
FIG. 7 is a diagram of a differential circuit in a variation of the differential circuit in FIG. 3.
Figure 8:
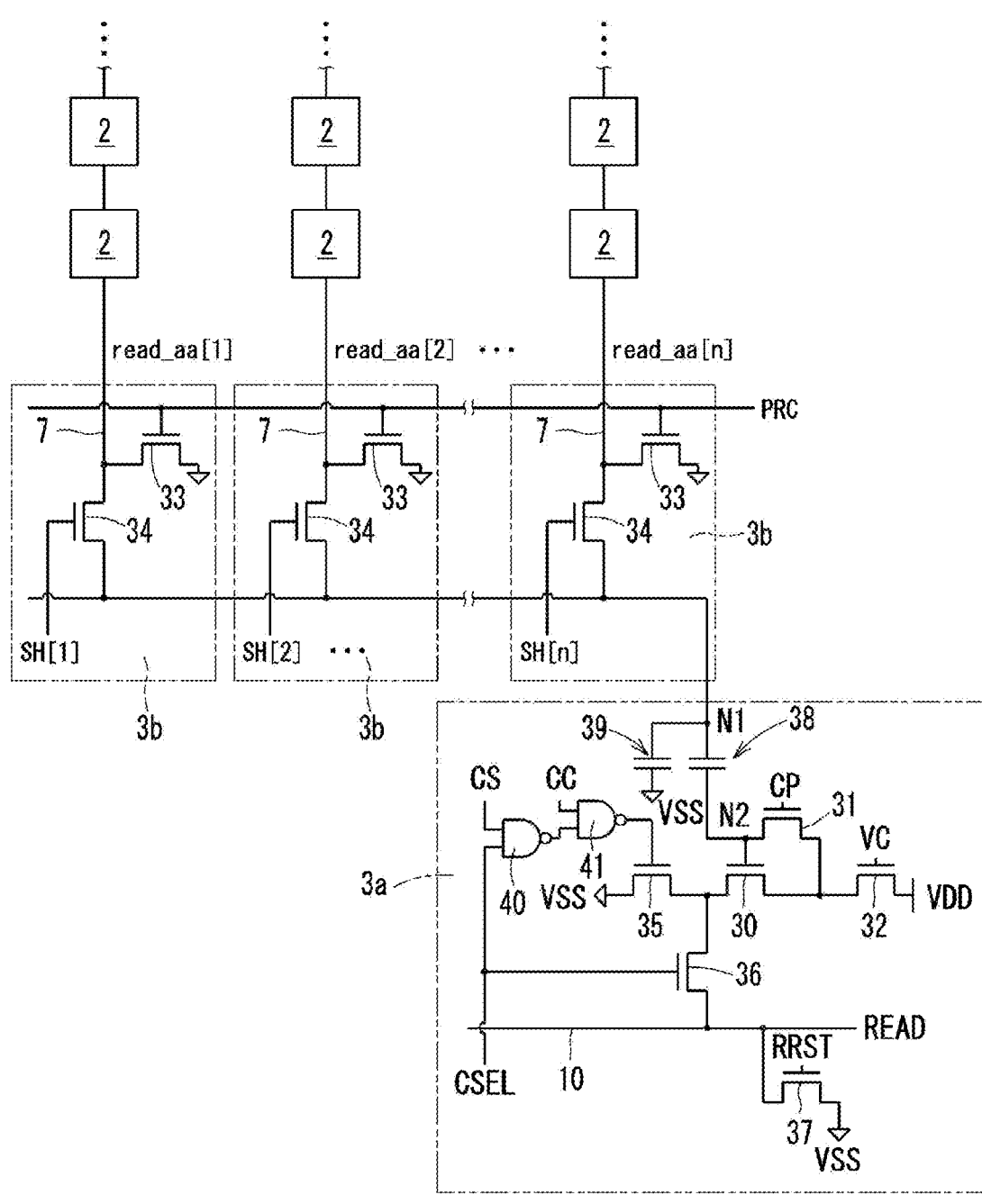
FIG. 8 is a diagram of a differential circuit in a variation of the differential circuit in FIG. 3.

FIG. 1 is a block diagram of an optical sensing circuit according to an embodiment of the present disclosure. FIG. 2 is a circuit diagram of a light detection circuit in the optical sensing circuit in FIG. 1. FIG. 3 is a circuit diagram of a differential circuit in the optical sensing circuit in FIG. 1. FIG. 4A is a diagram describing the operation of the light detection circuit in a reset state. FIG. 4B is a diagram describing the operation of the light detection circuit in an exposure state. FIG. 4C is a diagram describing the operation of the light detection circuit in an exposure readout state. FIG. 4D is a diagram describing the operation of the light detection circuit in a reset readout state. FIG. 5A is a diagram describing the operation of the differential circuit in a reset period. FIG. 5B is a diagram describing the operation of the differential circuit in an exposure readout period. FIG. 5C is a diagram describing the operation of the differential circuit in a reset readout period. FIG. 5D is a diagram describing the operation of the differential circuit in a sample holding period. FIG. 5E is a diagram describing the operation of the differential circuit in a readout line reset period. FIG. 5F is a diagram describing the operation of the differential circuit in a readout period. FIG. 6 is a timing chart describing the operation of the optical sensing circuit in FIG. 1. FIGS. 7 and 8 are diagrams of differential circuits in variations of the differential circuit in FIG. 3.

In the present embodiment, an optical sensing circuit 1 includes light detection circuits 2, differential circuits 3, and a control circuit 4.

The optical sensing circuit 1 further includes a substrate 5 as illustrated in FIG. 1. The substrate 5 includes a first surface (one main surface) 5a. The light detection circuits 2 are located on the first surface 5a. In the same manner as or in a similar manner to the light detection circuits 2, shift registers SR, the differential circuits 3, and the control circuit 4 may be located on the first surface 5a. The substrate 5 may be, for example, a glass substrate, a resin substrate, a ceramic substrate, or a semiconductor substrate. The shift registers SR, the light detection circuits 2, the differential circuits 3, and the control circuit 4 may be located on the first surface 5a with an insulating layer between these components and the first surface 5a. The insulating layer is made of an inorganic material such as silicon oxide (SiO$_2$) or silicon nitride (Si$_3$N$_4$), or an organic material such as an acrylic resin or a polycarbonate resin. The shift registers SR, the differential circuits 3, and the control circuits 4 may be located on the other main surface opposite to the first surface 5a.

The control circuit 4 controls the shift registers SR, the light detection circuits 2, and the differential circuits 3. The control circuit 4 provides control signals and other signals to the light detection circuits 2 and the differential circuits 3 through multiple wires. The control circuit 4 may include, for example, an IC or an LSI circuit.

As illustrated in FIG. 1, the optical sensing circuit 1 includes power lines 6, first readout signal lines 7, reset signal lines 8, and selection signal lines 9. The power lines 6 are connected to an external power supply (not illustrated). The power lines 6 receive a first voltage VDD generated by the external power supply. The power lines 6 may be connected to the external power supply through the control circuit 4. The optical sensing circuit 1 includes wires (not illustrated) for supplying a second voltage VSS to the light detection circuits 2 and the differential circuits 3. The second voltage VSS is lower than the first voltage VDD. The reset signal lines 8 and the selection signal lines 9 are connected to the control circuit 4. The reset signal lines 8 receive reset signals RST generated by the control circuit 4. The selection signal lines 9 receive selection signals RS generated by the control circuit 4. Each of the first readout signal lines 7 is connected to some of the light detection circuits 2 and one of the differential circuits 3. The first readout signal line 7 transfers a voltage read_aa output from a selection transistor 23 to the differential circuit 3. Each of the shift registers SR is connected to the control circuit 4 and one of the differential circuits 3, reads an output voltage from the differential circuit 3, and transfers the voltage to the control circuit.

As illustrated in FIG. 2, each of the light detection circuits 2 includes a photodiode 20, a first amplifier transistor 21, a reset transistor 22, and a selection transistor 23.

The photodiode 20 includes an anode electrode 20a and a cathode electrode 20b. The anode electrode 20a may receive a bias voltage generated by the control circuit 4. The photodiode 20 may be, for example, a PN photodiode or a PIN photodiode, or another photodiode.

The first amplifier transistor 21, the reset transistor 22, and the selection transistor 23 are three-terminal elements each including a gate electrode, a source electrode, and a drain electrode. The first amplifier transistor 21, the reset transistor 22, and the selection transistor 23 may be thin-film transistors (TFTs). The first amplifier transistor 21, the reset transistor 22, and the selection transistor 23 may be n-channel TFTs.

The first amplifier transistor 21 includes a gate electrode connected to the cathode electrode 20b, a source electrode connected to the drain electrode of the selection transistor 23, and a drain electrode connected to the power line 6. The reset transistor 22 includes a gate electrode connected to the reset signal line 8, a source electrode connected to the cathode electrode 20b, and a drain electrode connected to the power line 6. The selection transistor 23 includes a gate electrode connected to the selection signal line 9, a source electrode connected to the first readout signal line 7, and the drain electrode connected to the source electrode of the first amplifier transistor 21.

The light detection circuit 2 operates in the reset state, in the exposure state, in the exposure readout state, and in the reset readout state. The control circuit 4 controls the state of the light detection circuit 2 by controlling each of the reset signal RST and the selection signal RS.

As illustrated in FIG. 4A, the reset state is a state in which the reset signal RST is a high-level (H) signal and the selection signal RS is a low-level (L) signal. The H signal may be a signal having the same voltage as the first voltage VDD. The L signal may be a signal having the same voltage as the second voltage VSS. In the reset state, the reset transistor 22 is conductive, and the selection transistor 23 is nonconductive. In the reset state, the voltage at the gate electrode (also referred to as a gate voltage) of the first amplifier transistor 21 is VDD-$V_{TH1}$, where $V_{TH1}$ is a threshold voltage of the reset transistor 22.

As illustrated in FIG. 4B, the exposure state is a state in which both the reset signal RST and the selection signal RS are L signals. In the exposure state, the reset transistor 22 and the selection transistor 23 are nonconductive. In the exposure state, the cathode electrode 20b outputs a current corresponding to the amount of light received by the photodiode 20. Thus, the gate voltage of the first amplifier transistor 21 changes based on the amount of light received by the photodiode 20. The gate voltage is VDD-$V_{TH1}$-$V_{PHOTO}$, where $V_{PHOTO}$ is a change in the gate voltage of the first amplifier transistor 21 caused by the current output from the cathode electrode 20b. $V_{PHOTO}$ is also referred to as an exposure voltage.

As illustrated in FIG. 4C, the exposure readout state is a state in which the reset signal RST is a L signal and the selection signal RS is a H signal. In the exposure readout state, the reset transistor 22 is nonconductive, and the selection transistor 23 is conductive. In the exposure readout state, the gate voltage of the first amplifier transistor 21 is a voltage that changes based on the amount of light received by the photodiode (more specifically, VDD-$V_{TH1}$-$V_{PHOTO}$), and the selection transistor 23 outputs the voltage read_aa corresponding to the gate voltage of the first amplifier transistor 21 to the first readout signal line 7. The voltage read_aa in the exposure readout state (hereafter also referred to as an exposure readout voltage $V_{EXP}$) is VDD-$V_{TH1}$-$V_{PHOTO}$-$V_{TH2}$, where $V_{TH2}$ is a threshold voltage of the first amplifier transistor 21.

As illustrated in FIG. 4D, the reset readout state is a state in which the reset signal RST and the selection signal RS are both H signals. In the reset readout state, the reset transistor 22 and the selection transistor 23 are conductive. In the reset readout state, the gate voltage of the first amplifier transistor 21 is a constant predetermined voltage VDD-$V_{TH1}$ that is independent of the amount of light received by the photodiode 20. The selection transistor 23 outputs the voltage read_aa corresponding to the gate voltage of the first amplifier transistor 21 to the first readout signal line 7. The voltage read_aa in the reset readout state (hereafter also referred to as a reset readout voltage $V_{RST}$) is VDD-$V_{TH1}$-$V_{TH2}$.

The exposure voltage $V_{PHOTO}$ may be determined by determining the difference between the exposure readout voltage $V_{EXP}$ and the reset readout voltage $V_{RST}$. However, with the differential circuits each including an amplifier transistor, variations in the threshold voltages of the amplifier transistors may cause detection irregularities in the optical sensing circuit including multiple differential circuits. In the present embodiment, the optical sensing circuit 1 can reduce detection irregularities caused by variations in the threshold voltages of the amplifier transistors in the differential circuits 3.

As illustrated in FIG. 3, each of the differential circuits 3 includes a second amplifier transistor 30, a first transistor 31, and a second transistor 32. The second amplifier transistor 30, the first transistor 31, and the second transistor 32 are three-terminal elements each including a gate electrode, a source electrode, and a drain electrode, and may be n-channel TFTs.

The second amplifier transistor 30 amplifies the difference between the exposure readout voltage $V_{EXP}$ and the reset readout voltage $V_{RST}$ and outputs the resultant difference. The second amplifier transistor 30 includes a gate electrode connected to the first readout signal line 7 through a fourth transistor 34 and a first capacitor 38 described later.

The gate electrode of the first transistor 31 receives a first control signal CP generated by the control circuit 4. The first transistor 31 connects the gate electrode of the second amplifier transistor 30 and the drain electrode of the second amplifier transistor 30.

The gate electrode of the second transistor 32 receives a second control signal VC generated by the control circuit 4. The second transistor 32 connects the drain electrode of the second amplifier transistor 30 and the first voltage VDD.

As illustrated in FIG. 3, the differential circuit 3 further includes a third transistor 33, the fourth transistor 34, a fifth transistor 35, a sixth transistor 36, and a seventh transistor 37. The third transistor 33, the fourth transistor 34, the fifth transistor 35, the sixth transistor 36, and the seventh transistor 37 are three-terminal elements each including a gate electrode, a source electrode, and a drain electrode, and may be n-channel TFTs.

As illustrated in FIG. 3, the differential circuit 3 further includes the first capacitor 38 and a second capacitor 39. The first capacitor 38 includes a first electrode 38a and a second electrode 38b. The second capacitor 39 includes a first electrode 39a and a second electrode 39b.

As illustrated in FIG. 3, the differential circuit 3 further includes a first NAND circuit 40 and a second NAND circuit 41. The first NAND circuit 40 and the second NAND circuit 41 are negated logical product (NAND) logic gate circuits. Each of the first NAND circuit 40 and the second NAND circuit 41 includes two input terminals. One of the two input terminals of the first NAND circuit 40 receives a third control signal CS generated by the control circuit 4. The other of the two input terminals of the first NAND circuit 40 receives a fourth control signal CSEL generated by the control circuit 4. Note that the fourth control signal CSEL is input into the first NAND circuit 40 through the shift register SR as illustrated in FIGS. 1 and 3. One of the two input terminals of the second NAND circuit 41 receives the output from the first NAND circuit 40. The other of the two input terminals of the second NAND circuit 41 receives a fifth control signal CC generated by the control circuit 4.

As illustrated in FIG. 3, the differential circuit 3 further includes a second readout signal line 10. The second readout signal line 10 is a wire for outputting, to an external device, the difference between the exposure readout voltage $V_{EXP}$ and the reset readout voltage $V_{RST}$ amplified by the second amplifier transistor 30.

Hereafter, a portion of the differential circuit 3 except the third transistor 33 and the fourth transistor 34 is also referred to as a difference generator 3a, and a portion of the differential circuit 3 including the third transistor 33 and the fourth transistor 34 is also referred to as a reader 3b (refer to FIG. 3).

The gate electrode of the third transistor 33 receives a sixth control signal PRC generated by the control circuit 4. The third transistor 33 connects the first readout signal line 7 and the second voltage VSS that is lower than the first voltage VDD.

The gate electrode of the fourth transistor 34 receives a seventh control signal SH generated by the control circuit 4. The fourth transistor 34 connects the first readout signal line 7 and the first electrode 38a of the first capacitor 38, and connects the first readout signal line 7 and the first electrode 39a of the second capacitor 39.

The gate electrode of the fifth transistor 35 receives an output from the second NAND circuit 41. The fifth transistor 35 connects the source electrode of the second amplifier transistor 30 and the second voltage VSS.

The gate electrode of the sixth transistor 36 receives the fourth control signal CSEL. The sixth transistor 36 connects the source electrode of the second amplifier transistor 30 and the second readout signal line 10.

The gate electrode of the seventh transistor 37 receives an eighth control signal RRST generated by the control circuit 4. The seventh transistor 37 connects the second readout signal line and the second voltage VSS.

The control circuit 4 is connected to the first transistor 31, the second transistor 32, the first NAND circuit 40, the second NAND circuit 41, the third transistor 33, the fourth transistor 34, and the seventh transistor 37 through multiple wires (not illustrated). The control circuit 4 controls the operation of the differential circuit 3 by controlling each of the first control signal CP, the second control signal VC, the third control signal CS, the fourth control signal CSEL, the fifth control signal CC, the sixth control signal PRC, the seventh control signal SH, and the eighth control signal RRST.

The light detection circuit 2 and the differential circuit 3 operate in a reset period P1, in an exposure period P2, in an exposure readout period P3, in a reset readout period P4, in a sample holding period P5, in a readout line reset period P6, and in a readout period P7 and repeat their operations in this order.

In the reset period P1, the control circuit 4 turns the light detection circuit 2 into the reset state as illustrated in FIGS. 4A and 6. As illustrated in FIGS. 5A and 6, the control circuit 4 causes the first transistor 31, the second transistor 32, the third transistor 33, and the fourth transistor 34 to be conductive and the fifth transistor 35, the sixth transistor 36, and the seventh transistor 37 to be nonconductive. The voltage at the first electrode 38a (also referred to as an N1 node) of the first capacitor 38 then becomes the second voltage VSS, and the voltage at the gate electrode (also referred as an N2 node) of the second amplifier transistor 30 becomes the first voltage VDD.

In the exposure period P2, the control circuit 4 turns the light detection circuit 2 into the exposure state as illustrated in FIGS. 4B and 6. As illustrated in FIGS. 5A and 6, the control circuit 4 causes the first transistor 31, the second transistor 32, the third transistor 33, the fourth transistor 34 to remain conductive and the fifth transistor 35, the sixth transistor 36, and the seventh transistor 37 to remain nonconductive. The voltage at the N1 node is the second voltage VSS, and the voltage at the N2 node is the first voltage VDD.

The exposure readout period P3 is a period in which an exposure readout voltage $V_{EXP}$ is read from the light detection circuit 2 in the exposure readout state and the read exposure readout voltage $V_{EXP}$ is received by the differential circuit 3. In the exposure readout period P3, the control circuit 4 turns the light detection circuit 2 into the exposure readout state as illustrated in FIGS. 4C and 6. As illustrated in FIGS. 5B and 6, the control circuit 4 causes the first transistor 31, the fourth transistor 34, and the fifth transistor 35 to be conductive and the second transistor 32, the third transistor 33, the sixth transistor 36, and the seventh transistor 37 to be nonconductive. The voltage at the N1 node is thus the exposure readout voltage $V_{EXP}$ (more specifically, $VDD-V_{TH1}-V_{PHOTO}-V_{TH2}$) output from the light detection circuit 2 in the exposure readout state. The N2 node is connected to the second voltage VSS through the conductive first transistor 31, the conductive fourth transistor 34, and the conductive fifth transistor 35. Thus, the voltage at the N2 node is $VSS+V_{TH3}$, where $V_{TH3}$ is a threshold voltage of the second amplifier transistor 30.

The reset readout period P4 is a period in which a reset readout voltage $V_{RST}$ is read from the light detection circuit 2 in the reset readout state and the read reset readout voltage $V_{RST}$ is received by the differential circuit 3. In the reset readout period P4, the control circuit 4 turns the light detection circuit 2 into the reset readout state as illustrated in FIGS. 4D and 6. As illustrated in FIGS. 5C and 6, the control circuit 4 causes the fourth transistor 34 to be conductive and the first transistor 31, the second transistor 32, the third transistor 33, the fifth transistor 35, the sixth transistor 36, and the seventh transistor 37 to be nonconductive. The voltage at the N1 node thus becomes the reset readout voltage $V_{RST}$ (more specifically, $VDD-V_{TH1}-V_{TH2}$) output from the light detection circuit 2 in the reset readout state. The voltage at the N1 node is higher than the voltage at the N1 node in the exposure readout period P3 by the exposure voltage $V_{PHOTO}$. With the first capacitor 38 connecting the N1 node and the N2 node through alternating current (AC) coupling, the voltage at the N2 node increases by the exposure voltage $V_{PHOTO}$ based on the increase in the voltage at the N1 node and becomes $VSS+V_{TH3}+V_{PHOTO}$.

In the sample holding period P5, the control circuit 4 causes both the reset transistor 22 and the selection transistor 23 to be nonconductive. This turns the light detection circuit 2 into a state substantially equivalent to the exposure state. The light detection circuit 2 in the sample holding period P5 is also referred to as being in a standby state. As illustrated in FIGS. 5D and 6, the control circuit 4 causes the first transistor 31, the second transistor 32, the third transistor 33, the fourth transistor 34, the fifth transistor 35, the sixth transistor 36, and the seventh transistor 37 to be nonconductive. Thus, the voltage at the N1 node remains being the reset readout voltage $V_{RST}$, and the voltage at the N2 node remains being $VSS+V_{TH3}+V_{PHOTO}$.

In the readout line reset period P6, the control circuit 4 causes the light detection circuit 2 to remain in the standby state as illustrated in FIG. 6. As illustrated in FIGS. 5E and 6, the control circuit 4 causes the seventh transistor 37 to be conductive and the first transistor 31, the second transistor 32, the third transistor 33, the fourth transistor 34, the fifth transistor 35, and the sixth transistor 36 to be nonconductive. The second readout signal line 10 is thus electrically connected to the second voltage VSS. This resets the voltage of the second readout signal line 10 to the second voltage VSS. The voltage at the N1 node remains being the reset readout voltage $V_{RST}$, and the voltage at the N2 node remains being $VSS+V_{TH3}+V_{PHOTO}$.

In the readout period P7, the control circuit 4 causes the light detection circuit 2 to remain in the standby state as illustrated in FIG. 6. As illustrated in FIGS. 5F and 6, the control circuit 4 causes the second transistor 32, the fifth transistor 35, and the sixth transistor 36 to be conductive, and the first transistor 31, the third transistor 33, the fourth transistor 34, and the seventh transistor 37 to be nonconductive. The second amplifier transistor 30 thus outputs a voltage (hereafter also referred to as a differential voltage $V_{DIFF}$) $VSS+V_{PHOTO}$ corresponding to the voltage at the N2 node (more specifically, $VSS+V_{TH3}+V_{PHOTO}$) from the source electrode to the second readout signal line 10.

In the readout period P7, the conductive fifth transistor 35 can generate a sink current at the source electrode of the second amplifier transistor 30. This allows quick and stable output of the differential voltage $V_{DIFF}$. Note that the differential circuit 3 may not generate a sink current in the second readout signal line 10. In the readout period P7, the control circuit 4 may provide a L signal as the third control signal CS input into the first NAND circuit 40 to cause the fifth transistor 35 to be nonconductive, and no sink current may be generated in the second readout signal line 10.

In the embodiments of the present disclosure, as described above, the optical sensing circuit 1 includes the differential circuit 3 including the first transistor 31 and the second transistor 32 and thus can output the differential voltage $V_{DIFF}$ that is independent of the threshold voltage $V_{TH3}$ of the second amplifier transistor 30. Thus, the optical sensing circuit 1 including the multiple differential circuits 3 can reduce detection irregularities caused by variations in the threshold voltages $V_{TH3}$ of the second amplifier transistors 30.

In one or more embodiments of the present disclosure, a method for driving the optical sensing circuit includes driving the optical sensing circuit 1 to allow output of the differential voltage $V_{DIFF}$ that is independent of the threshold voltage $V_{TH3}$ of the second amplifier transistor 30 by causing the first transistor 31 to be conductive and the second transistor 32 to be nonconductive when the exposure readout voltage $V_{EXP}$ is read from the light detection circuit 2, causing the first transistor 31 and the second transistor 32 to be nonconductive when the reset readout voltage $V_{RST}$ is read from the light detection circuit 2, and causing the first transistor 31 to be nonconductive and the second transistor 32 to be conductive when the differential circuit 3 outputs the difference between the exposure readout voltage $V_{EXP}$ and the reset readout voltage $V_{RST}$. Thus, the optical sensing circuit 1 including the multiple differential circuits 3 can reduce detection irregularities caused by variations in the threshold voltages $V_{TH3}$ of the second amplifier transistors 30.

The differential circuit 3 may include a bypass transistor 42 as illustrated in FIG. 7. The bypass transistor 42 is a three-terminal element including a gate electrode, a source electrode, and a drain electrode. The bypass transistor 42 may be an n-channel TFT. The gate electrode of the bypass transistor 42 receives a ninth control signal BP generated by the control circuit 4. The bypass transistor 42 connects the first readout signal line 7 and the source electrode of the second amplifier transistor 30. In the exposure readout period P3 and the reset readout period P4, when the bypass transistor 42 is conductive and the fourth transistor 34 is nonconductive, the voltage read_aa read from the light detection circuit 2 may be directly output to the second readout signal line 10. The operation of the differential circuit 3 can be examined by analyzing the voltage read_aa read from the light detection circuit 2 and the voltage $VSS+V_{PHOTO}$ output from the differential circuit 3 using an external device.

The optical sensing circuit 1 may include multiple light detection circuits 2 as illustrated in FIG. 1. The multiple light detection circuits 2 may be arranged in a matrix of m rows and n columns (m and n are natural numbers greater than or equal to 2). The m pieces of light detection circuits 2 in each of the columns share the same first readout signal line 7 and may be connected to a single differential circuit 3. This structure allows the optical sensing circuit 1 to be smaller in the circuit size (layout area) than a structure including differential circuits 3 for each of the multiple light detection circuits 2. The single differential circuit 3 is configured to output a first differential voltage $V_{DIFF}$ and, subsequently, a second differential voltage $V_{DIFF}$. The first differential voltage $V_{DIFF}$ is output based on the exposure readout voltage $V_{EXP}$ and the reset readout voltage $V_{RST}$ output from a first light detection circuit 2 in the m pieces of light detection circuits 2. The second differential voltage $V_{DIFF}$ is output based on the exposure readout voltage $V_{EXP}$ and the reset readout voltage $V_{RST}$ output from a second light detection circuit 2 in the m pieces of the light detection circuits 2. The second light detection circuit 2 may be in the reset state and in the exposure state while the first light detection circuit 2 is in the reset state and in the exposure state. This allows the optical sensing circuit 1 that has output the first differential voltage $V_{DIFF}$ to shift to the exposure readout period P3 for the second light detection circuit 2, thus shortening the processing time for the m pieces of light detection circuits 2.

As illustrated in FIG. 8, the optical sensing circuit 1 may include multiple light detection circuits 2 arranged in a matrix, multiple readers 3b for each of the columns of the multiple light detection circuits 2, and a single difference generator 3a. This structure allows the optical sensing circuit 1 to be smaller in the circuit size (layout area) than a structure including differential circuits 3 for each of the columns of the multiple light detection circuits 2. The control circuit 4 is configured to input seventh control signals SH[1], . . . , SH[n] into the multiple readers 3b to cause the multiple fourth transistors 34 to be conductive in a sequential manner, and read voltages read_aa [1], . . . , read_aa [n] output from the respective columns at the N1 node. The control circuit 4 may input the same sixth control signal PRC into the multiple third transistors 33. The control circuit 4 controls the single difference generator 3a in the same manner as or in a similar manner to the method described above, and will not be described repeatedly.

The optical sensing circuit 1 including the multiple light detection circuits 2 and the single differential circuit 3 tends to include longer connection wires to connect the light detection circuits 2 and the differential circuit 3. Thus, the connection wires are more likely to be electrified in the manufacturing processes of the optical sensing circuit 1, thus increasing the likelihood that the first capacitor 38 and the second capacitor 39 are damaged. The first capacitor 38 and the second capacitor 39 formed in a wiring layer different from the layer for the connection wires can reduce the likelihood of the first capacitor 38 and the second capacitor 39 being damaged in the manufacturing processes of the optical sensing circuit 1.

The optical sensing circuit 1 used in a sample observation apparatus or a radiation image forming apparatus will be described below.

The optical sensing circuit 1 may be used in a sample observation apparatus for observing samples such as animal cells, plant cells, yeast cells, or bacterial cells. The sample observation apparatus may include a container for containing a sample, a light source for illuminating the sample with light, and the optical sensing circuit 1 that detects part of light scattered by the sample. The sample observation apparatus including the optical sensing circuit 1 allows accurate sample observation with reduced detection irregularities in the optical sensing circuit 1.

The optical sensing circuit 1 may be used in a radiation image forming apparatus. The radiation image forming apparatus may include a scintillator and the optical sensing circuit 1. The scintillator transforms radiation such as a, B, or y rays into light that is detectable by the photodiode 20. The radiation image forming apparatus including the optical sensing circuit 1 can generate a radiation image with less irregularities with reduced detection irregularities in the optical sensing circuit 1. Specifically, the optical sensing circuit 1 may be used in a medical radiation image forming apparatus (also referred to as an X-ray apparatus). The X-ray apparatus may include a scintillator and the optical sensing circuit 1. The scintillator transforms X rays into light that is detectable by the photodiode 20. The X-ray apparatus including the optical sensing circuit 1 can generate an X-ray image with less irregularities with reduced detection irregularities in the optical sensing circuit 1.

In the embodiments of the present disclosure, the optical sensing circuit and the method for driving the optical sensing circuit can reduce detection irregularities caused by varying characteristics of the amplifier transistors included in the light detection circuits and the differential circuits.

The optical sensing circuit according to one or more embodiments of the present disclosure may have aspects (1) to (5) described below.

(1) An optical sensing circuit, comprising:

a light detection circuit including a photodiode with a cathode electrode and a first amplifier transistor with a gate electrode connected to the cathode electrode, the light detection circuit being configured to output a voltage corresponding to a voltage at the gate electrode, the light detection circuit being operable in an exposure readout state in which the voltage at the gate electrode changes based on an amount of light received by the photodiode or in a reset readout state in which the voltage at the gate electrode is a constant predetermined voltage;

a differential circuit configured to determine a difference between an exposure voltage read from the light detection circuit in the exposure readout state and a reset voltage read from the light detection circuit in the reset readout state, the differential circuit including a second amplifier transistor configured to output the determined difference, a first transistor connecting a gate electrode of the second amplifier transistor and a drain electrode of the second amplifier transistor, and a second transistor connecting the drain electrode of the second amplifier transistor and a first voltage; and a controller configured to control the light detection circuit and the differential circuit.

(2) The optical sensing circuit according to (1), wherein the controller causes the first transistor to be conductive and the second transistor to be nonconductive when the exposure voltage is read from the light detection circuit.

(3) The optical sensing circuit according to (1) or (2), wherein the controller causes the first transistor and the second transistor to be nonconductive when the reset voltage is read from the light detection circuit.

(4) The optical sensing circuit according to any one of (1) to (3), wherein the controller causes the first transistor to be nonconductive and the second transistor to be conductive when the differential circuit outputs the difference between the exposure voltage and the reset voltage.

(5) The optical sensing circuit according to any one of (1) to (4), wherein the differential circuit includes a capacitor including an electrode connected to a source electrode of the first amplifier transistor and another electrode connected to the gate electrode of the second amplifier transistor.

The method for driving the optical sensing circuit according to one or more embodiments of the present disclosure may have aspects (6) and (7) described below.

(6) A method for driving an optical sensing circuit, the optical sensing circuit including a light detection circuit and a differential circuit, the light detection circuit including a photodiode with a cathode electrode and a first amplifier transistor with a gate electrode connected to the cathode electrode, the light detection circuit being configured to output a voltage corresponding to a voltage at the gate electrode, the light detection circuit being operable in an exposure readout state in which the voltage at the gate electrode changes based on an amount of light received by the photodiode or in a reset readout state in which the voltage at the gate electrode is a constant predetermined voltage, the differential circuit being configured to determine a difference between an exposure voltage read from the light detection circuit in the exposure readout state and a reset voltage read from the light detection circuit in the reset readout state, the differential circuit including a second amplifier transistor configured to output the determined difference, a first transistor connecting a gate electrode of the second amplifier transistor and a drain electrode of the second amplifier transistor, and a second transistor connecting the drain electrode of the second amplifier transistor and a first voltage, the method comprising:

causing the first transistor to be conductive and the second transistor to be nonconductive when the exposure voltage is read from the light detection circuit;

causing the first transistor and the second transistor to be nonconductive when the reset voltage is read from the light detection circuit; and causing the first transistor to be nonconductive and the second transistor to be conductive when the differential circuit outputs the difference between the exposure voltage and the reset voltage.

(7) The method according to (6), further comprising:

causing the first transistor to be nonconductive and the second transistor to be conductive when the differential circuit outputs the difference between the exposure voltage and the reset voltage.

Although the optical sensing circuit and the method for driving the optical sensing circuit according to the embodiments of the present disclosure are described in detail, the optical sensing circuit and the method for driving the optical sensing circuit according to the embodiments of the present disclosure are not limited to those in the above embodiments, and may be changed or varied in various manners without departing from the spirit and scope of the present disclosure. The components described in the above embodiments may be entirely or partially combined as appropriate unless any contradiction arises.

REFERENCE SIGNS

1 optical sensing circuit
2 light detection circuit
3 differential circuit
3*a* difference generator
3*b* reader
4 control circuit
5 substrate
5*a* first surface
5*b* second surface
6 power line
7 first readout signal line
8 reset signal line
9 selection signal line 10 second readout signal line
20 photodiode
20a anode electrode
20b cathode electrode
21 first amplifier transistor
22 reset transistor
23 selection transistor
30 second amplifier transistor
31 first transistor
32 second transistor
33 third transistor
34 fourth transistor
35 fifth transistor
36 sixth transistor
37 seventh transistor
38 first capacitor
38a first electrode
38b second electrode
39 second capacitor
39a first electrode
39b second electrode
40 first NAND circuit
41 second NAND circuit
42 bypass transistor
SR shift register

The invention claimed is:

1. An optical sensing circuit, comprising:
   a light detection circuit including a photodiode with a cathode electrode and a first amplifier transistor with a gate electrode connected to the cathode electrode, the light detection circuit being configured to output a voltage corresponding to a voltage at the gate electrode, the light detection circuit being operable in an exposure readout state in which the voltage at the gate electrode changes based on an amount of light received by the photodiode or in a reset readout state in which the voltage at the gate electrode is a constant predetermined voltage;
   a differential circuit configured to determine a difference between an exposure voltage read from the light detection circuit in the exposure readout state and a reset voltage read from the light detection circuit in the reset readout state, the differential circuit including a second amplifier transistor configured to output the determined difference, a first transistor connecting a gate electrode of the second amplifier transistor and a drain electrode of the second amplifier transistor, and a second transistor connecting the drain electrode of the second amplifier transistor and a first voltage; and
   a controller configured to control the light detection circuit and the differential circuit.

2. The optical sensing circuit according to claim 1, wherein
   the controller causes the first transistor to be conductive and the second transistor to be nonconductive when the exposure voltage is read from the light detection circuit.

3. The optical sensing circuit according to claim 1, wherein
   the controller causes the first transistor and the second transistor to be nonconductive when the reset voltage is read from the light detection circuit.

4. The optical sensing circuit according to claim 1, wherein
   the controller causes the first transistor to be nonconductive and the second transistor to be conductive when the differential circuit outputs the difference between the exposure voltage and the reset voltage.

5. The optical sensing circuit according to claim 1, wherein
   the differential circuit includes a capacitor including an electrode connected to a source electrode of the first amplifier transistor and another electrode connected to the gate electrode of the second amplifier transistor.

6. A method for driving an optical sensing circuit, the optical sensing circuit including a light detection circuit and a differential circuit, the light detection circuit including a photodiode with a cathode electrode and a first amplifier transistor with a gate electrode connected to the cathode electrode, the light detection circuit being configured to output a voltage corresponding to a voltage at the gate electrode, the light detection circuit being operable in an exposure readout state in which the voltage at the gate electrode changes based on an amount of light received by the photodiode or in a reset readout state in which the voltage at the gate electrode is a constant predetermined voltage, the differential circuit being configured to determine a difference between an exposure voltage read from the light detection circuit in the exposure readout state and a reset voltage read from the light detection circuit in the reset readout state, the differential circuit including a second amplifier transistor configured to output the determined difference, a first transistor connecting a gate electrode of the second amplifier transistor and a drain electrode of the second amplifier transistor, and a second transistor connecting the drain electrode of the second amplifier transistor and a first voltage, the method comprising:
   causing the first transistor to be conductive and the second transistor to be nonconductive when the exposure voltage is read from the light detection circuit;
   causing the first transistor and the second transistor to be nonconductive when the reset voltage is read from the light detection circuit; and
   causing the first transistor to be nonconductive and the second transistor to be conductive when the differential circuit outputs the difference between the exposure voltage and the reset voltage.

7. The method according to claim 6, further comprising:
   causing the first transistor to be nonconductive and the second transistor to be conductive when the differential circuit outputs the difference between the exposure voltage and the reset voltage.

* * * * *